United States Patent [19]

Kasai et al.

[11] 3,876,393

[45] Apr. 8, 1975

[54] METHOD AND ARTICLE FOR REMOVING MERCURY FROM GASES CONTAMINATED THEREWITH

[75] Inventors: Juichi Kasai, Fujisawa; Kazuo Miyazaki, Kamakura; Keiji Kawasaki; Buntaro Kawase, both of Tokyo, all of Japan

[73] Assignee: Showa Denko Kabushiki Kaisha, Tokyo, Japan

[22] Filed: Nov. 26, 1973

[21] Appl. No.: 419,213

[30] Foreign Application Priority Data
Dec. 4, 1972    Japan.............................. 47-120726

[52] U.S. Cl.......................................... 55/68; 55/72
[51] Int. Cl............................................ B01d 53/04
[58] Field of Search .................. 55/68, 72, 74, 387; 423/210, 508, 509

[56] References Cited
UNITED STATES PATENTS

| | | | |
|---|---|---|---|
| 3,194,629 | 7/1965 | Dreibelbis et al................... | 423/210 |
| 3,677,696 | 7/1972 | Bryk et al............................. | 55/72 |
| 3,786,619 | 1/1974 | Melkersson........................... | 55/72 |

*Primary Examiner*—Charles N. Hart
*Attorney, Agent, or Firm*—Fitzpatrick, Cella, Harper & Scinto

[57] ABSTRACT

Mercury is removed from gases contaminated therewith by passing the gases in contact with activated carbon which has been impregnated with sulfuric acid. Carbon impregnation by soaking in a sulfuric acid solution and drying at preferred temperatures as well as mercury adsorption at preferred temperatures is also disclosed.

12 Claims, No Drawings

METHOD AND ARTICLE FOR REMOVING MERCURY FROM GASES CONTAMINATED THEREWITH

This invention relates to the removal of mercury from gases contaminated therewith, and more particularly it concerns the removal of mercury from gases containing some amount of other impurities such as sulfur dioxide and halogens together with mercury.

In recent years, with serious consideration being given to air pollution caused by mercury vapor, treatment has come to be required for eliminating mercury from various gases such as the exhaust gases from mercury mines, from non-ferrous metal smelting plants, from coal-fired boilers and from incinerators for rubbish as well as from the waste sludge of sewage treatment plants.

There are also various other mercury-containing gases which require treatment for mercury removal. These other gases include the environmental gases from plants in which mercury thermometers, mercury lamps and mirrors are manufactured as well as the gases from plants in which caustic soda is made (using mercury electrolytic cells), and some chemical agents; and they further include the by-product hydrogen gas generated from mercury electrolytic brine cells. These various other mercury-containing gases, however, are of relatively simple composition, and it is relatively easy to remove the mercury from them by conventional methods.

However, no economical process has previously been established for removing mercury from the first-mentioned gases. This is because gases discharged from mercury mines, non-ferrous metal smelting plants, coal-fired boilers and rubbish incinerators, and from waste sludge of sewage treatment plants, contain various additional impurities together with the mercury, especially additional impurities such as halogen compounds, sulfur compounds and some kinds of heavy metals which interrupt the effective mercury removal treatment.

In the past, various techniques and arrangements have been proposed for removing mercury from gases; and these may be divided into two general types: the wet process (absorbing process using a washing solution) and the dry process (adsorbing process using solid materials).

The following are examples of these processes:

1. Washing with chlorine water.

This process comprises washing the mercury-containing gas with water containing free chlorine so as to convert the mercury vapor into mercury chloride. This in turn is dissolved in water. The treated gas is then washed with an aqueous solution of caustic soda to remove the chlorine gas which has evaporated from the washing solution during the mercury removal process. A single stage modification to the process has been proposed in which alkaline hypochlorite-brine solution is used as the washing solution. (See for example British Patent No. 1,250,171.)

This process, however, has some practical disadvantages. For example, delicate control may be required, and a large amount of reagent is consumed when some amounts of sulfur dioxide are present in the gas to be treated.

2. Washing with permanganate solution.

This process comprises washing a mercury-containing gas with an acidic washing solution containing brown precipitate which is formed by contacting mercury vapor with a compound of manganese having a valency greater than 3. (See, for example, Japanese Patent No. 532,910.) In this process, however, any sulfur dioxide gas, which may be present in the gas to be treated is absorbed preferentially to mercury vapor by the washing solution. In such cases, therefore, this process is not practical.

3. Adsorbing with solid materials.

This process comprises passing the mercury-containing gas over solid materials so that the mercury becomes adsorbed on them. Various adsorbents have been proposed, such as activated carbon impregnated with a metal which forms an amalgam with mercury, especially silver, gold or copper. (See for example U.S. Pat. No. 3,193,987.) It has also been proposed to use activated carbon impregnated with elemented sulfur. This adsorbent is obtained by impregnating activated carbon with a solution of carbon disulfide containing sulfur and then evaporating the mixture to dryness. (See for example U.S. Pat. No. 3,194,629.) Other proposed adsorbents include a mass of particles of aluminum oxide impregnated with silver metal (see U.S. Pat. No. 3,257,776), activated carbon impregnated with alkalipolysulfide, alkalisulfide or alkalihydrosulfide (see German Patent DAS 1,075,953), and solid materials composed mainly of permanganate (see Japanese Patent Sho 45-23521).

Processes using the above-mentioned solid materials as the adsorbent for mercury, however, have for practical purposes some defects such as those in the aforementioned wet processes. These defects occur where impurities such as sulfur dioxide, halogens and their compounds exist in the gas to be treated. This is because sulfur dioxide or halogen gases react with the metal used as the impregnant to form sulfur or halogen compounds of metals prior to or concurrent with the adsorption of mercury, thus making the adsorbent inactive in a short period. As for the sulfur-impregnated activated carbon, it is undesirable to use a flammable solvent in preparing the absorbent. Furthermore, some kinds of sulfur-carbon compound formed in the resulting mass are believed to be dangerous in firing at relatively low temperatures.

The present invention permits the removal of mercury vapor from gases in a manner which is both technically and commercially satisfactory. In this connection, it has been discovered that activated carbon impregnated with sulfuric acid exhibits high efficiency as an adsorbent for mercury in gas and has sufficient adsorbing capacity for use over prolonged period. It has also been discovered that such adsorbent has a very stable adsorbing capacity even when an impurity such as sulfur dioxide, halogens and/or their compounds is present in the gas to be treated. Moreover, this adsorbent can be applied more extensively than can the prior methods.

In one aspect, the present invention comprises the technique of passing a mercury-containing gas over activated carbon impregnated with sulfuric acid, to eliminate the mercury from the gas by causing the mercury to be adsorbed on the acid impregnated carbon. The mercury-containing gases to which this technique can be applied include air, hydrogen, nitrogen and carbon dioxide such as are given off from diverse sources such as manufacturing plants for manufacturing mercury, thermometers, mercury lamp, mirrors, and caustic soda (where mercury electrolytic cells and some chemical agents are used). The technique, however, may exhibit the best effects in the case of gases containing sulfur dioxide, halogens and/or their compounds as impurities together with mercury of gases may be discharged, for example, from mercury mines, from non-ferrous metal smelting plants, from coal-fired boilers and from rubbish incinerators, as well as from the waste sludge of sewage treatment plants.

In another aspect, the present invention involves the preparation of a mercury adsorbent. While this preparation can be carried out easily using conventional means, it is preferred that the adsorbent be prepared by immersing activated carbon in an aqueous solution of sulfuric acid, followed by drying the resulting mass. In this case, the concentration of sulfuric acid is not limited, but a 30–80 percent by weight of aqueous solution may be preferred from the practical point of view. Also, while the drying may be done at room temperature in the atmosphere, it has been found that the adsorbing capacity increases to a very high level when dried at 100°–200°C in an air stream for several hours. Irrespective of the method employed, it is preferred that the activated carbon of the present invention contain more than 10 percent of sulfuric acid by weight of the activated carbon.

The action of activated carbon appears to be specific in the present invention, since it has not been possible to obtain satisfactory effectiveness in removing mercury from gases with other solid materials, for example, silica gel, activated alumina or zeolite, which are normally used as adsorbents, are used in place of activated carbon as the support for sulfuric acid. In view of this, and in view of the fact that activated carbon itself has little adsorbing capacity for removing mercury from gases, it is expected that there is some catalytic action on the adsorptive surface of activated carbon in conjunction with sulfuric acid.

In carrying out the present invention there can be used any kind of activated carbon including that which is obtained in granular or crushed form by destructive distillation of wood, coal, nut shells, animal bones or other carbonaceous materials, followed with activation by conventional means, e.g., by heating to high temperatures in a stream of steam or carbon dioxide. In general, it is preferred to use granular activated carbon having an average particle size between about 1 and 10 mm in diameter, although this can be varied.

The present adsorbent may be applied to various kinds of reactor (adsorbers), e.g., fixed bed, fluidized bed or moving bed reactors, and it can be used over a wide range of adsorption temperatures and space velocities of the gas containing mercury.

In addition to the foregoing it has also been discovered that the rate of adsorption of mercury depends mainly on the adsorption temperature and the moisture of the gas to be treated, and more particularly that the residual content of mercury in the treated gas can be reduced to a level that can not be detected by a conventional mercury detector (i.e., less than 0.01 mg Hg/Nm$^{3}$*), when carried out under the conditions represented by the following general formula, $$t > \frac{1}{A - B \log P} - 273$$

wherein, $t$ represents the adsorption temperature (°C), P represents the partial pressure of water in the gas to be treated (mmHg) and both A and B represent the calculation factors, $3.34 \times 10^{-3}$, and, $3.7 \times 10^{-4}$, respectively.

* Nm$^{3}$ = gas volume at zero °C. under 1 atmosphere pressure.

Thus, according to the present invention, it is possible to remove nearly all of the mercury from various mercury-containing gases even when these contain sulfur dioxide in amounts of 100 ppm to 15% by volume, along with halogens and other impurities, and it is possible to reduce the residual content of mercury in the treated gas to less than 0.01 mg per cubic meter. Furthermore, it is possible to operate at high temperatures and at high space velocities for prolonged periods without any decrease in adsorbing capacity. Thus, the present invention can be applied to high temperature treatment without any cooling; and the adsorbing unit can be made compact.

EXAMPLE 1

Air, drawn off from a blower, was conducted through a mercury vapor saturator and a water vapor saturator, each of which was maintained at 40°C. The air from these saturators, after being heated to a desired temperature, was conducted into the bottom part of a gas adsorber. The gas adsorber was made of a tubular glass having an inner diameter of 25 mm and a length of 300 mm and it was packed with 100 ml of an adsorbent which was prepared by immersing granular activated carbon (about 1–2 mm average diameter) in an aqueous solution of sulfuric acid of 70% concentration, followed by drying of the resulting mass at 150°C in an air stream for 2 hours.

The mercury content in the gas at the inlet and the outlet of the adsorber was measured by a mercury detector (detection limit: 0.02 mg/Nm$^{3}$).

The results are shown with the conditions in the following table:

| Experiment No. | Flow rate of gas litres/hr | Adsorbing temperature °C | Mercury content of gas mg/Nm$^{3}$ | |
|---|---|---|---|---|
| | | | Inlet | Outlet |
| 1 | 1,000 | 120 | 28 | Not detected |
| 2 | 3,000 | 120 | 26 | " |
| 3 | 5,000 | 120 | 24 | " |
| 4 | 1,000 | 95 | 28 | 0.10 |
| 5 | 1,000 | 80 | 27 | 0.25 |

EXAMPLE 2

Example 1 was repeated, except that air admixed with sulfur dioxide gas was used.

The results are shown with the conditions in the following table:

| Experiment No. | Flow rate of gas litres/hr | Adsorbing temperature °C | SO$_2$ content vol% | Mercury content of gas mg/Nm$^{3}$ | |
|---|---|---|---|---|---|
| | | | | Inlet | Outlet |
| 6 | 1,000 | 120 | 0.8 | 25 | not detected |
| 7 | 3,000 | 120 | 2.0 | 29 | " |
| 8 | 5,000 | 120 | 8.0 | 23 | " |
| 9 | 1,000 | 90 | 8.0 | 26 | 0.12 |
| 10 | 1,000 | 50 | 8.0 | 28 | 1.2 |

In this case, sulfur dioxide adsorption did not occur.

EXAMPLE 3

Example 1 was repeated, with the exception that the dew point of the water vapor in the air was controlled at −10°C by using silica gel as a water adsorber.

The results are shown with the conditions in the following table:

| Experiment No. | Flow rate of gas litres/hr | Adsorbing SO$_2$ temperature °C | of gas content vol% | Mercury content mg/Nm$^3$ Inlet | Outlet |
|---|---|---|---|---|---|
| 11 | 1,000 | 50 | 8.0 | 28 | not detected |
| 12 | 5,000 | 50 | 8.0 | 29 | " |
| 13 | 5,000 | 50 | — | 29 | " |
| 14 | 1,000 | 30 | 8.0 | 20 | 0.15 |
| 15 | 1,000 | 30 | — | 20 | 0.12 |

EXAMPLE 4

Example 1 was repeated, with the exception that nitrogen gas, hydrogen gas and carbon dioxide gas, respectively, were used in place of air.

The same results were obtained for each gas.

EXAMPLE 5

An adsorption test was conducted using same apparatus as in the case of example 1; and no mercury was detected in the outlet gas during an operation of more than 4 months, during which time the following conditions were provided:

| | |
|---|---|
| Adsorbent: | 100 ml, prepared by the same means as in the case of example 1 and carried out such that the initial amount of sulfuric acid in the resulting mass was 48% by weight of the activated carbon; |
| Objective gas: | Air containing 2–3% sulfur dioxide by volume, 28–30 mg/Nm$^3$ of mercury and water vapor saturated at 35°C; |
| Gas flow rate: | 1,000 litres/hr; |
| Gas temperature: | 110–120°C |

EXAMPLE 6

Example 1 was repeated, with the exception that various solid materials were used as the support for sulfuric acid in place of activated carbon.

The result for each adsorbent is shown in the following table:

| Experiment | Solid material | Mercury content of gas mg/Nm$^3$ Inlet | Outlet |
|---|---|---|---|
| 20 | Activated carbon | 25 | not detected |
| 21 | Activated alumina | 22 | 10.0 |
| 22 | Semi-synthetic zeolite | 26 | 7.0 |
| 23 | Synthetic zeolite | 26 | 1.5 |
| 24 | Faujasite | 26 | 1.0 |

The gas flow rate was 1,000 litres/hr; and the adsorption temperature was 120°C.

EXAMPLE 7

Gas discharged from plants for roasting sulfide ores and containing mercury vapor in amounts of about 5–12 mg/Nm$^3$, along with sulfur dioxide gas in amounts of about 6–8 percent by volume and water vapor saturated at 40°C, was conducted at 120°C and at rates of 100 m$^3$/hr into a mercury adsorber through a dust separator.

The mercury adsorber was constructed of stainless steel having an inner diameter of 300 mm and a length of 1,500 mm and was packed in three stages with 20 litres of activated carbon, which was prepared by immersing pillar-shaped activated carbon having a diameter of 4–5 mm and a length of 5–6 mm, into an aqueous solution of sulfuric acid of 50% concentration, followed by drying the resulting mass at 130°C in an air stream for 8 hours.

No mercury vapor was detected in the outlet gas during operation for more than 3 months. In this experiment, the adsorption of sulfur dioxide was found to be negligibly small.

The adsorbed mercury can be recovered by subjecting the spent activated carbon to a temperature of over 200°C in a stream of superheated steam to eliminate mercury therefrom, and by cooling the resulting stream carrying mercury vapor to about room temperature, thus condensing the mercury together with the steam.

What is claimed is:

1. A method of removing mercury vapor from a gas containing said vapor, said method comprising the step of passing said gas in contact with activated carbon impregnated with sulfuric acid.

2. A method according to claim 1 wherein the gas is selected from the group consisting of air, hydrogen, nitrogen and carbon dioxide.

3. A method according to claim 1 wherein the gas is passed over the activated carbon impregnated with sulfuric acid under the conditions represented by the following general formula, $$t > \frac{1}{A - B \log P} - 273$$

wherein $t$ represents the adsorption temperature in degrees Centigrade, P represents the partial pressure of water in the gas to be treated, in mm. of Hg and both A and B represent the calculation factors $3.34 \times 10^{-3}$ and $3.7 \times 10^{-4}$, respectively.

4. A method according to claim 1 wherein the adsorbed mercury is recovered by subjecting the spent activated carbon to a temperature of over 200°C in a stream of super heated steam to eliminate the mercury therefrom, and by cooling the stream carrying mercury vapor to around room temperature, thus condensing the mercury metal together with the water.

5. A method according to claim 1 wherein the gas is air containing contaminants of the type produced by one of the following sources: mercury mines, nonferrous metal smelting plants and coal fired-boilers.

6. A method of removing mercury vapor from a gas containing said vapor, said method comprising the step of passing said gas in contact with a solid material comprising activated carbon impregnated with sulfuric acid which solid material has been prepared by immersing activated carbon in an aqueous solution of sulfuric acid having a sulfuric acid concentration ranging from 30 to 80 percent by weight, and drying the resulting material at a temperature ranging from 100° to 200°C in an air stream.

7. A method according to claim 6, wherein the gas is selected from a group consisting of air, hydrogen, nitrogen and carbon dioxide.

8. A method according to claim 6, wherein the gas is passed over activated carbon impregnated with sulfuric acid under the conditions represented by the following general formula, $$t > \frac{1}{A - B \log P} - 273$$

wherein t represents the adsorption temperature in °C, P represents the partial pressure, in millimeters of Hg, of the water in the gas to be treated, and A and B represent the calculation factors $3.34 \times 10^{-3}$ and $3.7 \times 10^{-4}$, respectively.

9. A method of selectively removing substantially all of the mercury vapor from a gas which contains said mercury vapor, said method comprising the step of contacting the mercury vapor in said gas with a solid adsorbent which consists essentially of activated carbon impregnated with sulfuric acid to thereby adsorb said mercury vapor on said adsorbent, said adsorbent being prepared by (1) immersing activated carbon in an aqueous solution of sulfuric acid having a sulfuric acid concentration of from 30 to 80 percent by weight, and (2) drying the resulting material at a temperature of from 100° to 200°C in an air stream.

10. A method according to claim 9, wherein said contacting is performed at a temperature which is determined by the partial pressure of water vapor in said gas, according to the following formula:

$$t > \frac{1}{A - B \log P} - 273$$

wherein t represents the adsorption temperature in °C, P represents the partial pressure of water in the gas to be treated, in mm. of Hg, and A and B represent the calculation factors $3.34 \times 10^{-3}$ and $3.7 \times 10^{-4}$, respectively.

11. A method according to claim 10, wherein said gas also contains, in addition to said mercury vapor, sulfur dioxide vapor, halogen vapor and vapors of compounds thereof.

12. A method according to claim 11, wherein the amount of sulfuric acid impregnated in said activated carbon is more than ten percent by weight, based on the weight of said activated carbon.

* * * * *

UNITED STATES PATENT OFFICE
CERTIFICATE OF CORRECTION

Patent No. 3,876,393                    Dated April 8, 1975

Inventor(s) JUICHI KASAI, ET AL.

It is certified that error appears in the above-identified patent and that said Letters Patent are hereby corrected as shown below:

Column 5, the chart of EXAMPLE 3, the third column heading,

"Adsorbing $SO_2$ temperature °C"    to read    -- Adsorbing temperature °C --;

the fourth column heading,

"of gas content vol%"    to read    -- content vol% --;

the fifth column heading,

"Mercury content mg/$Nm^3$"    to read    -- Mercury content of gas mg/$Nm^3$ --.

Signed and Sealed this twenty-second Day of July 1975

[SEAL]

Attest:

RUTH C. MASON
*Attesting Officer*

C. MARSHALL DANN
*Commissioner of Patents and Trademarks*